United States Patent [19]

Kimura et al.

[11] Patent Number: 5,049,426
[45] Date of Patent: Sep. 17, 1991

[54] HELICAL FORMED TAKE-UP LINER FOR UNCURED RUBBER MEMBERS AND METHOD OF PRODUCING THE SAME

[75] Inventors: Iwao Kimura, Kurume; Akira Toyonaga, Hikone; Koichi Sanada, Tokyo; Koji Nonaka, Tokyo; Kenichi Haraga, Tokyo, all of Japan

[73] Assignees: Pyramid Corporation, Fukuoka; Bridgestone Corporation, Tokyo, both of Japan

[21] Appl. No.: 389,467

[22] Filed: Aug. 4, 1989

[30] Foreign Application Priority Data

Aug. 8, 1988 [JP] Japan .................. 63-196073

[51] Int. Cl.$^5$ .................. B32B 1/02; B32B 1/10; B32B 5/26
[52] U.S. Cl. .................. 428/36.2; 156/160; 156/163; 156/224; 156/229; 156/307.7; 428/36.5; 428/36.8; 428/36.91; 428/175; 428/230; 428/246; 428/309.9; 428/316.6; 428/317.5; 428/319.3
[58] Field of Search .............. 156/160, 163, 224, 229, 156/307.7; 428/36.2, 36.5, 36.8, 36.91, 175, 230, 246, 309.9, 316.6, 317.5, 319.3

[56] References Cited

U.S. PATENT DOCUMENTS 4,239,064  12/1980  Gilman ............... 428/36.5
4,761,324   8/1988  Rautenberg et al. ... 428/230

FOREIGN PATENT DOCUMENTS 53-153064  12/1978  Japan .
61-111261   5/1986  Japan .
62-273237  11/1987  Japan .
63-139858   6/1988  Japan .

Primary Examiner—James C. Cannon
Attorney, Agent, or Firm—Sughrue, Mion, Zinn, Macpeak & Seas

[57] ABSTRACT

A take-up liner for uncured rubber members is a band-like laminate of inextensible reinforcing cloth, flexible foamed layer arranged thereon, extensible cloth arranged thereon and sheet-like elastomer layer adhered thereto and has a helical formed shape.

3 Claims, 2 Drawing Sheets

HELICAL FORMED TAKE-UP LINER FOR UNCURED RUBBER MEMBERS AND METHOD OF PRODUCING THE SAME

BACKGROUND OF THE INVENTION

1. Field of the Invention

This invention relates to a helical formed take-up liner for uncured rubber members and a method of producing the same.

2. Related Art Statement

The uncured rubber members used, for example, for the manufacture of tires are frequently stored for a time between a step of supplying these members and a step of using these members to manufacture a tire. In this case, an elongated band-like uncured rubber member is usually stored as a scroll. In general, uncured rubber member is temporarily stored in form of a scroll by sandwiching between a pair of take-up liners in order to prevent the deformation of this member.

When the uncured rubber member to be stored is a contoured rubber member used, for example, in top and side treads, inner liner or the like, as shown in FIG. 3, the thickness of the uncured rubber member 7 differs in the widthwise direction thereof, so that when the uncured rubber members 7 are taken up together with take-up liners 1 at such a state that the convex portion of the member 7 locally protrudes from the liner 1, the outer diameter becomes different in the widthwise direction, and consequently the uncured rubber member 7 dewound in use takes a curved form in the longitudinal direction thereof as shown in FIG. 4. Furthermore, when the uncured rubber member is taken up as a continuous scroll, a portion of the uncured rubber member located at the inside of the scroll is crushed and deformed by its dead-weight. Moreover, wrinkles are produced in the liner, which are transferred onto the surface of the uncured rubber member to reject the rubber member as inferior goods. Therefore, it is attempted to improve the take-up liner.

In the conventional used take-up liner, a texture of a holding-up cloth reinforcing the liner is transferred onto the surface of the uncured rubber member during the taking up to lower the tackiness of the rubber member, and also the change of tackiness is caused in accordance with the taken up positions (outer, middle and inner positions). Therefore, when the laminating operation using such rubber members is carried out at the use step, there are caused the following problems:

(i) the bonding force to the other rubber member is weak;
(ii) the operability and efficiency considerably lower;
(iii) air is undesirably entrapped in the product;
(iv) the adhesion force at the interface between the rubber members as a product is poor; and
(v) volatile matter for rubber, rubber cement or the like is used for improving the bonding force, which takes extra cost and is unfavorable in view of operation environment.

In order to solve these problems, there is proposed a take-up liner as shown in FIG. 5, wherein a flexible foamed body 3 having a thickness of about 3–5 mm is adhered to each surface of a long and inextensible band-like reinforcing cloth 2, and an extensible holding-up cloth 4 is adhered to an outer surface of each of the foamed bodies 3, and a sheet-like elastomer 5 such as urethane, polyester, nylon, polypropylene, styrene-butadiene rubber (SBR), chloroprene rubber (CR), acrylonitrile-butadiene rubber (NBR), nitrile, silicone rubber or the like is further bonded thereon. In this liner, the movement of the extensible holding-up cloth 4 is restrained by the sheet-like elastomer 5 to form wrinkles 8 at the inside of the liner as shown in FIG. 6, which are also undesirably affected to the uncured rubber member during the taking up as previously mentioned.

SUMMARY OF THE INVENTION

The inventors have made studies in order to solve the aforementioned problems of the conventional techniques, and found that these problems can be solved by using an extensible and elastic member as an outer member to be bonded to the outer surface of the flexible foamed body in the aforementioned conventional take-up liner and intentionally forming a helical habit of the liner in accordance with a winding diameter during the taking up of the uncured rubber member, and as a result the invention has been accomplished.

According to a first aspect of the invention, there is the provision of a take-up liner for uncured rubber members, comprising a long band-like laminate of a long and inextensible band-like reinforcing cloth, a flexible foamed body arranged on one-side or both-side surfaces of the cloth, an extensible cloth arranged on the foamed body and a sheet-like elastomer layer arranged on the outer surface of the cloth, and having a helical foamed shape.

The take up liner for the uncured rubber member according to the invention has a helical formed shape matched with a winding diameter in the taking up of the uncured rubber member or followed to a winding curvature, so that the compressive force is mitigated at the inside of the liner during the taking up of the rubber member to cause no wrinkle.

According to a second aspect of the invention, there is the provision of a method of producing a take-up liner for uncured rubber members, which comprises adhering a flexible foamed body to either or both surfaces of a long and inextensible band-like reinforcing cloth, and then adhering a pair of extensible cloths bonded at their one-side surface with a sheet-like elastomer layer to both outer surfaces of the foamed body under a condition that one of these extensible cloths is strongly tensioned as compared with the other extensible cloth so as to provide a helical formed shape.

When the helical formed take-up liner for the uncured rubber member is manufactured by the method according to the second invention, it is favorable that the flexible foamed body is adhered to each surface of the long and inextensible band-like reinforcing cloth and then the extensible and elastic cloth bonded at its one-side surface with the sheet-like elastomer layer as an outer member is heat-welded to the outer surface of each of the flexible foamed bodies while strongly tensioning one of the outer members as compared with the other outer member. In this case, it is preferable to separately conduct the welding of these outer members. In this way, the strongly tensioned outer member is elastically restored and shrunk as compared with the remaining outer member to provide a helical formed shape. The degree of the helical forming can be controlled by the difference in tension force between these outer members.

According to a third aspect of the invention, there is the provision of a method of producing a take-up liner for uncured rubber members, which comprises adhering a flexible foamed body to either or both surfaces of a long and inextensible band-like reinforcing cloth, adhering an extensible cloth thereonto, applying a liquid of thermosetting elastomer thereto, taking up them as a scroll while holding the elastomer at a non-adhering state, and then curing the elastomer in the scroll.

When the take-up liner is manufactured by the method of the third invention, the flexible foamed body is preferably adhered to one-side of the inextensible cloth, and the extensible cloth is heat-welded thereto, and then the thermosetting elastomer is applied thereto in form of a sheet. On the other hand, the elastomer is applied to the other side of the inextensible cloth in form of a sheet and the extensible cloth is arranged at the outside of the elastomer sheet, which is then wound into a scroll. In this case, the latter extensible cloth follows to a bending state. When they are cured at the wound state, the helical formed shape can easily be provided.

In general, since the take-up liner has a given thickness, when the liner is wound together with the rubber member, the compressive force is applied to the inward portion of the liner located from the center of the thickness to produce wrinkles 8 as shown in FIG. 6. On the contrary, according to the invention, the helical formed shape is previously given to the liner, so that the compressive force is mitigated at the inward portion of the liner followed to the curvature of the winding, whereby the occurrence of wrinkles is completely prevented.

BRIEF DESCRIPTION OF THE DRAWINGS

The invention will be described with reference to the accompanying drawings, wherein.

DESCRIPTION OF THE PREFERRED EMBODIMENTS

The following examples are given in illustration of the invention and are not intended as limitations thereof.

EXAMPLE 1

Figure 1:
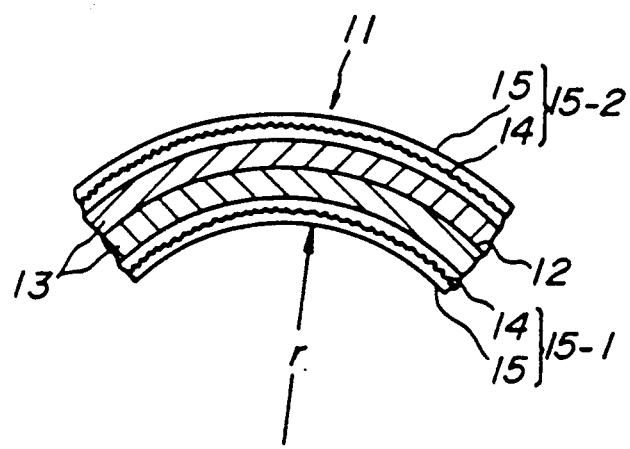
FIG. 1 is a partial sectional view of a first embodiment of the take-up liner according to the invention.

In this example was manufactured a take-up liner shown in FIG. 1.

At first, a flexible urethane foam 13 having a thickness of 3 mm was adhered to each surface of an inextensible reinforcing cloth 12 as a core through heat-welding. Then, two outer members 15-1 and 15-2 each obtained by previously adhering a thermosetting silicone rubber as an elastomer layer 15 to only a one-side surface of an extensible cloth 14 were adhered to outer surfaces of the flexible urethane foams 13 through heat-welding by successively changing tension forces of these outer members, whereby a helical formed take-up liner 11 was obtained.

In the thus obtained take-up liner 11, the radius r of curvature was varied within a range of 7.5cm~75cm.

EXAMPLE 2

Figure 2:
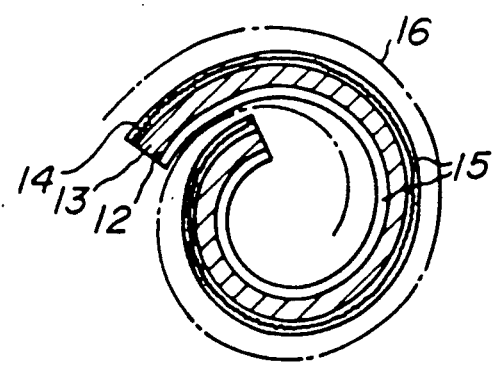
FIG. 2 is a sectional view of a second embodiment of the take-up liner according to the invention.
Figure 3:
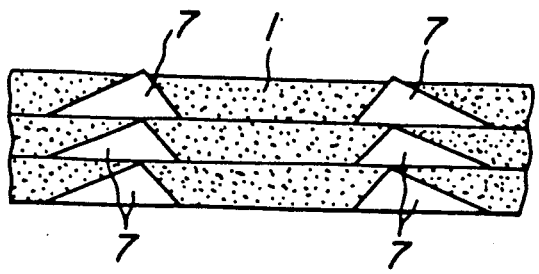
FIG. 3 is a partial sectional view of the conventional scroll taking up side rubbers for tires.
Figure 4:
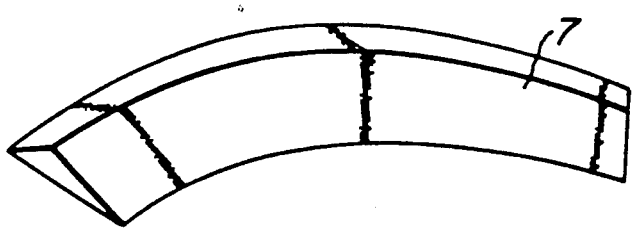
FIG. 4 is a perspective view showing a deformation state of a contoured rubber member dewound from the conventional scroll.
Figure 5:
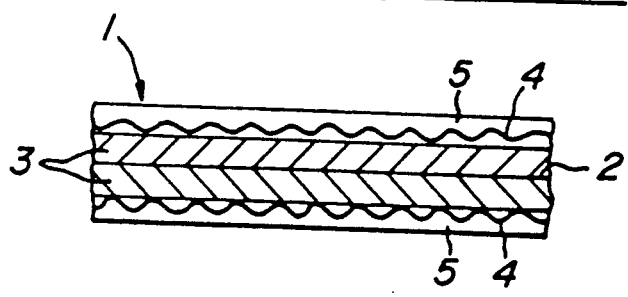
FIG. 5 is a partial sectional view of the conventional take-up liner.
Figure 6:
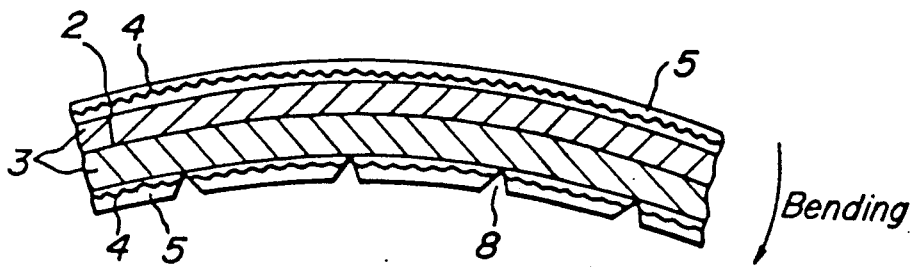
FIG. 6 is a sectional view showing the occurrence of wrinkles in the wound liner of FIG. 5.

In this example was manufactured a take-up liner shown in FIG. 2.

At first, an extensible cloth 14 was heat-welded to a surface of a flexible urethane foam 13 having a thickness of 5 mm, and at the same time an inextensible reinforcing cloth 12 was heat-welded to the other surface of the foam 13. Then, a self-curing liquid silicone rubber was applied to both outer surfaces to form sheet-like elastomer layers 15, which were heat treated to render into a non-tacked state to a certain extent. Furthermore, such an assembly was wound through a parting film 16 so as to locate the extensible cloth 14 toward outside and then cured to obtain a take-up liner.

Although the self-curing silicone rubber was used for the formation of the elastomer layer in this example, a thermosetting type elastomer may be used.

After the uncured rubber members were stored with the take-up liners obtained in Examples 1 and 2 over a day, the storing state was evaluated by dewinding the rubber member from the liner. As a result, the tackiness was good and the occurrence of wrinkles transferred from the liner was not observed.

As mentioned above, according to the invention, the uncured rubber members are taken up by the helical formed take-up liner composed of the laminate, so that the normal shape can be held without deformation by the extensible holding-up cloth, flexible urethane having a sufficient thickness and the like. Furthermore, the occurrence of wrinkles is not observed because the liner has a helical formed shape. Moreover, the degradation of the liner due to mechanical fatigue is lessened to elongate the life thereof.

What is claimed is:

1. A take-up liner for uncured rubber members, comprising a long band-like laminate of a long and inextensible band-like reinforcing cloth, a flexible foamed body arranged on one-side or both-side surfaces of the cloth, an extensible cloth arranged on the foamed body and a sheet-like elastomer layer arranged on the outer surface of the extensible cloth, and having a helical formed shape.

2. A method of producing a take-up liner for uncured rubber members, which comprises adhering a flexible foamed body to either or both surfaces of a long and inextensible band-like reinforcing cloth, and then adhering a pair of extensible cloths bonded at their one-side surface with a sheet-like elastomer layer to both outer surfaces of the foamed body under a condition that one of these extensible cloths is strongly tensioned as compared with the other extensible cloth so as to provide a helical formed shape.

3. A method of producing a take-up liner for uncured rubber members, which comprises adhering a flexible foamed body to either or both surfaces of a long and inextensible band-like reinforcing cloth, adhering an extensible cloth to the laminate formed, applying a liquid of thermosetting elastomer to the extensible cloth layer-containing laminate, taking-up the coated laminate in the form of a scroll and processing the applied elastomer to a less tacky state, and then curing the elastomer in scroll form.

* * * * *